United States Patent [19]

Genise

[11] Patent Number: 5,582,069
[45] Date of Patent: Dec. 10, 1996

[54] ENGINE ACCESSORY TORQUE AND ENGINE DECELERATION RATE DETERMINATION METHOD/SYSTEM

[75] Inventor: Thomas A. Genise, Dearborn, Mich.

[73] Assignee: Eaton Corporation, Cleveland, Ohio

[21] Appl. No.: 242,824

[22] Filed: May 16, 1994

[51] Int. Cl.$^6$ ............................ F16M 59/52; B60K 41/06
[52] U.S. Cl. ............................ 74/335; 477/120; 477/904
[58] Field of Search ............................ 74/335; 477/120, 477/904

[56] References Cited

U.S. PATENT DOCUMENTS

| | | | |
|---|---|---|---|
| 4,361,060 | 11/1982 | Smyth | 477/124 |
| 4,595,986 | 7/1986 | Daubenspeck et al. | 364/424.1 |
| 4,648,290 | 3/1987 | Dunkley et al. | 74/335 |
| 5,053,959 | 10/1991 | Genise | 74/335 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,133,229 | 7/1992 | Asada et al. | 364/424.1 |
| 5,172,609 | 12/1992 | Nitz et al. | 477/121 |
| 5,231,582 | 7/1993 | Takahashi et al. | 364/424.1 |
| 5,231,897 | 8/1993 | Morita | 477/124 |
| 5,241,476 | 8/1993 | Benford et al. | 364/424.1 |
| 5,272,939 | 12/1993 | Markyvech et al. | 477/120 |
| 5,335,566 | 8/1994 | Genise et al. | 477/904 X |

FOREIGN PATENT DOCUMENTS

| | | |
|---|---|---|
| 616919 | 9/1994 | European Pat. Off. . |
| 578398 | 12/1994 | European Pat. Off. . |
| 578399 | 12/1994 | European Pat. Off. . |
| 4240762 | 6/1993 | Germany ............................ 477/904 |
| 4304779 | 12/1993 | Germany . |
| 403169753 | 7/1991 | Japan ............................ 477/904 |

*Primary Examiner*—Khoi Q. Ta
*Attorney, Agent, or Firm*—Howard D. Gordon

[57] ABSTRACT

An adaptive control system/method for an at least partially automated vehicular mechanical transmission system (10) is provided for determining the value of a control parameter ($T_{ACCES}$) indicative of accessory torque when the vehicle is in motion and the value of a control parameter (dES/dt rate) indicative of engine deceleration rate when the vehicle is not in motion. A relationship (dES/dt rate=A+B * $T_{ACCES}$) between engine deceleration rate and accessory torque is determined and allows derivation of one parameter from the other parameter during vehicle operating conditions wherein the other parameter may be directly determined from sensed inputs ($T_{EG}$, $T_{BEF}$, ES).

22 Claims, 8 Drawing Sheets

ENGINE ACCESSORY TORQUE AND ENGINE DECELERATION RATE DETERMINATION METHOD/SYSTEM

BACKGROUND OF THE INVENTION

1. Related Applications

This application is related to U.S. Ser. No. 08/179,060, entitled ENGINE BRAKE ENHANCED UPSHIFT CONTROL METHOD/SYSTEM, filed Jan. 7, 1994, and assigned to the same assignee, EATON CORPORATION, as is this application.

This application is related to U.S. Ser. No. 08/192,522, entitled METHOD/SYSTEM TO DETERMINE GROSS COMBINATION WEIGHT OF VEHICLES, filed Feb. 7, 1994, and assigned to the same assignee, EATON CORPORATION, as is this application.

This application is related to U.S. Ser. No. 08/227,749, entitled ADAPTIVE SHIFT CONTROL METHOD/SYSTEM, filed Apr. 12, 1994, and assigned to the same assignee, EATON CORPORATION, as is this application.

This application is related to U.S. Ser. No. 08/225,271, entitled ENGINE DECELERATION DETERMINATION METHOD/SYSTEM, filed Apr. 5, 1994, and assigned to the same assignee, EATON CORPORATION, as is this application.

This application is related to U.S. Ser. No. 08/242,824, entitled ENGINE FLYWHEEL TORQUE DETERMINATION METHOD/SYSTEM, filed the same day, May 16, 1994, and assigned to the same assignee, EATON CORPORATION, as is this application.

2. Field of Invention

This invention relates to shift control methods/systems for at least partially automated vehicular mechanical transmission systems including various shift control techniques, such as control techniques wherein the desirability and/or probability of successfully completing a selected upshift are evaluated in view of existing vehicle operating conditions, which are based, at least in part, on determining and/or predicting the driving torque available at the vehicle drivewheels and/or the engine deceleration rate. In particular, the present invention relates to an adaptive shift control method/system for a fully or partially automated vehicular mechanical transmission system of the type shifting without disengagement of the vehicular master clutch which will determine a value indicative of vehicle drivewheel torque and/or the deceleration rate of the engine and will use these values as transmission system control parameters.

More particularly, the present invention relates to an adaptive shift control for automated vehicular mechanical transmission systems which, as a function of accessory torque, will continuously update the value of the control parameter indicative of engine flywheel torque, from which value and certain drivetrain characteristics, such as engaged gear ratio, tire size, efficiency, etc., drivewheel torque may be accurately determined and/or will continuously update the value of the control parameter indicative of deceleration rate of the engine. For automated or partially automated vehicular mechanical transmission systems, it is desirable to know the torque at the flywheel and/or the engine deceleration rate for many control algorithms. Knowing true torque at the flywheel and/or the engine deceleration rate will allow more precise shift control and makes possible advanced algorithms, such as shiftability and GCW calculations. The control system/method of the present invention uses torque information from the engine (preferably an electronic engine) along with vehicle and engine speed or acceleration information to calculate these control parameters.

3. Description of the Prior Art

Fully automatic and semi-automatic vehicular mechanical transmission systems utilizing electronic control units, usually microprocessor-based, are known in the prior art. Examples of such automated mechanical transmission systems may be seen by reference to U.S. Pat. Nos. 3,961,546; 4,361,060; 4,425,620; 4,631,679 and 4,648,290, the disclosures of which are incorporated herein by reference.

Another type of partially automated vehicular transmission system utilizes an automatic or semi-automatic shift implementation system/method for a mechanical transmission system for use in vehicles having a manually only controlled master clutch. The system usually has at least one mode of operation wherein the shifts to be automatically or semi-automatically implemented are automatically preselected. An electronic control unit (ECU) is provided for receiving input signals indicative of transmission input and output shaft speeds and/or engine speed and for processing same in accordance with predetermined logic rules to determine (i) if synchronous conditions exist, and (ii) in the automatic preselection mode, if an upshift or downshift from the currently engaged ratio is required and to issue command output signals to a transmission actuator and/or an engine fuel controller for shifting the transmission in accordance with the command output signals.

Transmission systems of this general type may be seen by reference to U.S. Pat. Nos. 5,050,079; 5,053,959; 5,053,961; 5,053,962; 5,063,511; 5,081,588; 5,089,962; 5,089,965 and 5,272,939, the disclosures of which are incorporated herein by reference.

While the above-described automatic and/or partially automatic shift implementation type vehicular mechanical transmission systems are well suited for their intended applications, they are not totally satisfactory as they will occasionally initiate an attempted shift, which, due to vehicle operating conditions, should not be permitted and/or cannot be completed. This is especially a concern for upshifts of a vehicle heavily loaded and/or traveling up a grade and/or for those automated mechanical transmission systems not provided with an automated clutch actuator and/or an input shaft brake and thus have input shaft deceleration limited to the normal or engine brake-assisted decay rate of the engine.

In accordance with the inventions of aforementioned co-pending U.S. Ser. No. 08/179,060 and U.S. Pat. No. 5,272,939, and of U.S. Pat. Nos. 5,133,229; 5,172,609 and 5,231,582, the disclosures of which are incorporated herein by reference, the above-discussed drawbacks of the prior art are minimized or overcome by the provision of shift control methods/systems for vehicular at least partially automated mechanical transmission systems which, upon sensing an automatic or manual selection of an upshift from a currently engaged gear ratio into a target gear ratio will, based upon currently sensed vehicle operating conditions, determine if the selected upshift is feasible (i.e., desirable and/or probably completible) and only initiate feasible shifts.

If the proposed upshift is not feasible, the shift request may be modified (i.e., a skip shift request changed to single shift) or cancelled for a predetermined period of time (such as 10 seconds).

The foregoing prior art control logic was not totally satisfactory, as the control parameter value indicative of drivewheel torque required expensive shaft torque sensors to acquire and/or was derived from gross engine torque values which do not account for torque losses due to vehicle assembler-installed accessories (such as air-conditioning, alternator, etc.) and for accelerating the engine. For example, during acceleration in the low gears of a heavy truck, the torque number reported from the engine on an SAE J1939-type datalink is a fairly high number at wide-open throttle. However, most of the torque the engine "says" it is producing is going to accelerate the engine rotating inertia and/or drivevehicle accessories and only a portion of that reported torque is going from the flywheel through the clutch to actually move the vehicle.

The foregoing prior art also was not totally satisfactory, as the expected rate of engine deceleration was difficult to determine with the vehicle at rest and not periodically performing upshifts.

SUMMARY OF THE INVENTION

In accordance with the present invention, the drawbacks of the prior art are minimized or overcome by the provision of an adaptive control for an at least partially automated vehicular mechanical transmission system which accurately determines a value indicative of engine accessory torque under current vehicle operating conditions and engine flywheel torque as a function of accessory torque and determines a value indicative of the deceleration rate of the engine. The control is particularly useful for vehicular automated mechanical transmission systems communicating with an electronically controlled internal combustion engine by means of a datalink of the type conforming to a protocol similar to SAE J1922 or J1939.

In a preferred embodiment of the present invention, the above is accomplished in a vehicular automated mechanical transmission system control of the type not automatically disengaging the master clutch during shifting operations, by utilizing the relationship that:

$$T_{EG} = T_{FW} + T_{BEF} + T_{ACCES} + T_{ACCEL}$$

where:

$T_{EG}$=gross engine torque;

$T_{FW}$=flywheel torque;

$T_{BEF}$=base engine friction torque (includes the torque to overcome engine internal friction and the torque to rotate the engine manufacturer-installed accessories (i.e., water pump, oil pump, etc.));

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment of inertia (I) of engine.

Instantaneous values representative of gross engine torque ($T_{EG}$) and base engine friction torque ($T_{BEF}$) are available on the datalink. $T_{ACCEL}$ is determined from sensed engine acceleration (which may be negative) and a calibrated moment of inertia (I) of the engine. Accessory torque ($T_{ACCES}$) is a constantly determined value which, Applicant has determined, may be taken as net engine torque (i.e., $T_{EG}-T_{BEF}$) if the vehicle is idling with the transmission in neutral and/or the master clutch disengaged and is related to engine deceleration rate in a known, substantially linear manner when the vehicle is at rest or in motion.

With the vehicle idling at rest, accessory torque ($T_{ACCES}$) is determined as a function of gross minus base friction torque ($T_{EG}-T_{BEF}$) and engine deceleration rate (dES/dt rate) is derived from the known relationship between engine deceleration rate and accessory torque. With the vehicle in motion, engine deceleration rate is sensed, preferably during upshift synchronizing operations, and accessory torque is derived from the known relationship between engine deceleration rate and accessory torque.

Accordingly, an adaptive control system/method for a vehicular at least partially automated mechanical transmission system is provided which continuously updates the value of a control parameter ($T_{ACCES}$) indicative of accessory torque and the value of a control parameter (dES/dt rate) indicative of the deceleration rate of the engine. These control parameters are used to control operation of the automated mechanical transmission system.

This and other objects and advantages of the present invention will become apparent from a reading of the detailed description of the preferred embodiment taken in connection with the attached drawings.

DESCRIPTION OF THE PREFERRED EMBODIMENT

Figure 1:
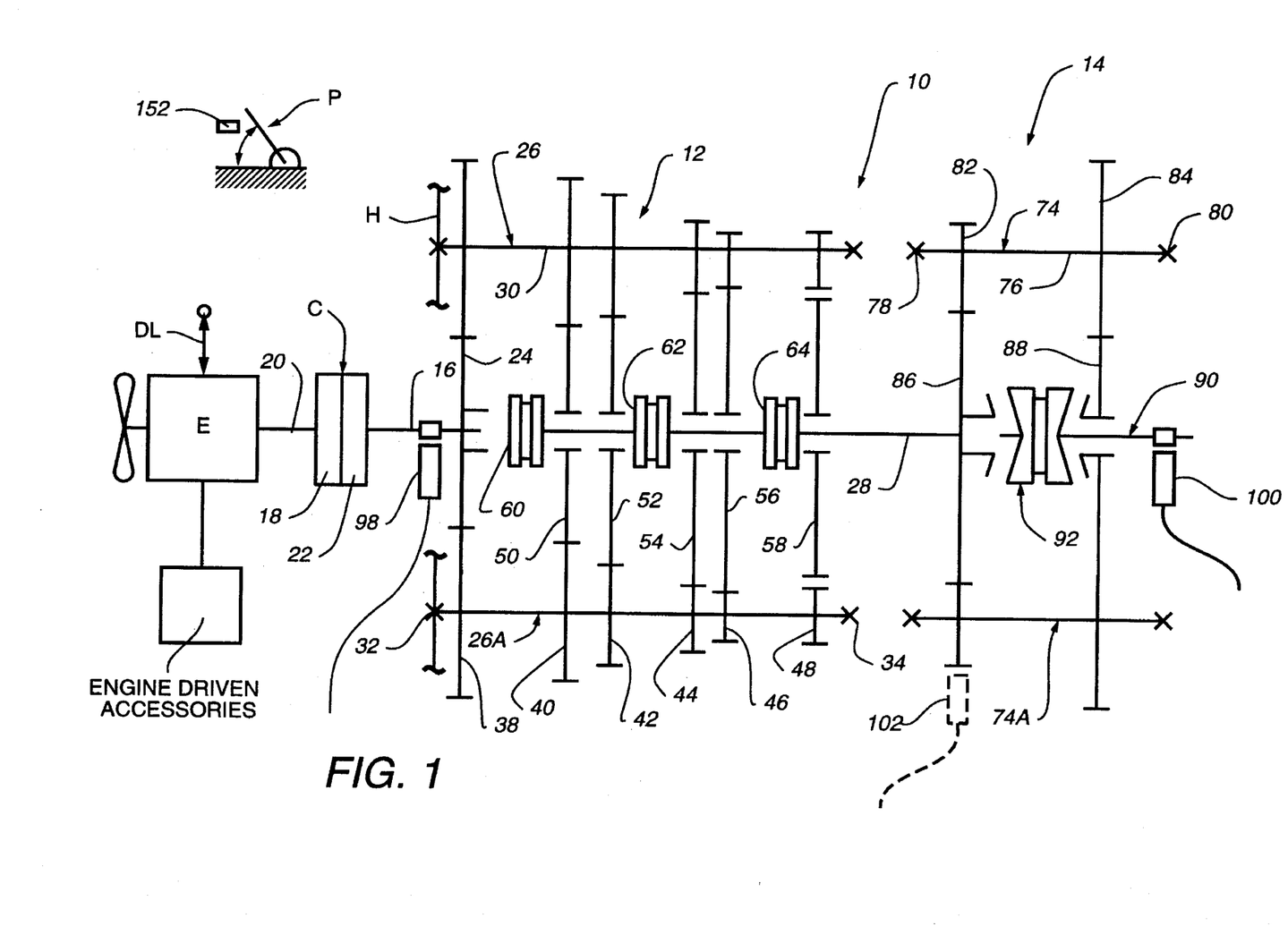
FIG. 1 is a schematic illustration of the vehicular mechanical transmission system partially automated by the system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Referring to FIG. 1, a range-type compound transmission 10 of the type at least partially automated by a semi-automatic mechanical transmission system having an automatic preselect mode of operation is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J 1922 or J 1939 protocol, and the master clutch C is manually controlled by a clutch pedal (not shown) or the like. Typically, the clutch C is utilized only for start-from-stop and for inching operation of the vehicle.

Transmissions similar to mechanical transmission 10 are well known in the prior art and may be appreciated by reference to U.S. Pat. Nos. 3,105,395; 3,283,613 and 4,754, 665, the disclosures of which are incorporated by reference.

Partially automated vehicular mechanical transmission systems of the type illustrated may be seen by reference to above-mentioned U.S. Pat. Nos. 5,050,079; 5,053,959; 5,053,961; 5,053,962; 5,063,511; 5,089,965 and 5,272,939.

Although the control method/system of the present invention is particularly useful for those automated mechanical transmission systems not having automatic clutch actuators or input shaft brakes, the present invention is not limited to such use.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
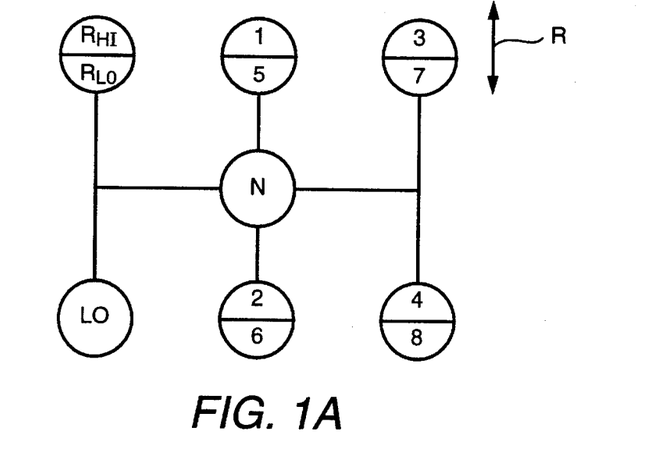
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are incorporated herein by reference.

Although the range-type auxiliary section 14 is illustrated as a two-speed section utilizing spur or helical type gearing:

it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing the automatic preselect mode of operation and the automatic or semi-automatic shift implementation operation of transmission 10, an input shaft speed (IS) sensor and an output shaft speed (OS) sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. Further, with main clutch C fully engaged, input shaft speed (IS) will equal engine speed (ES).

Figure 2:
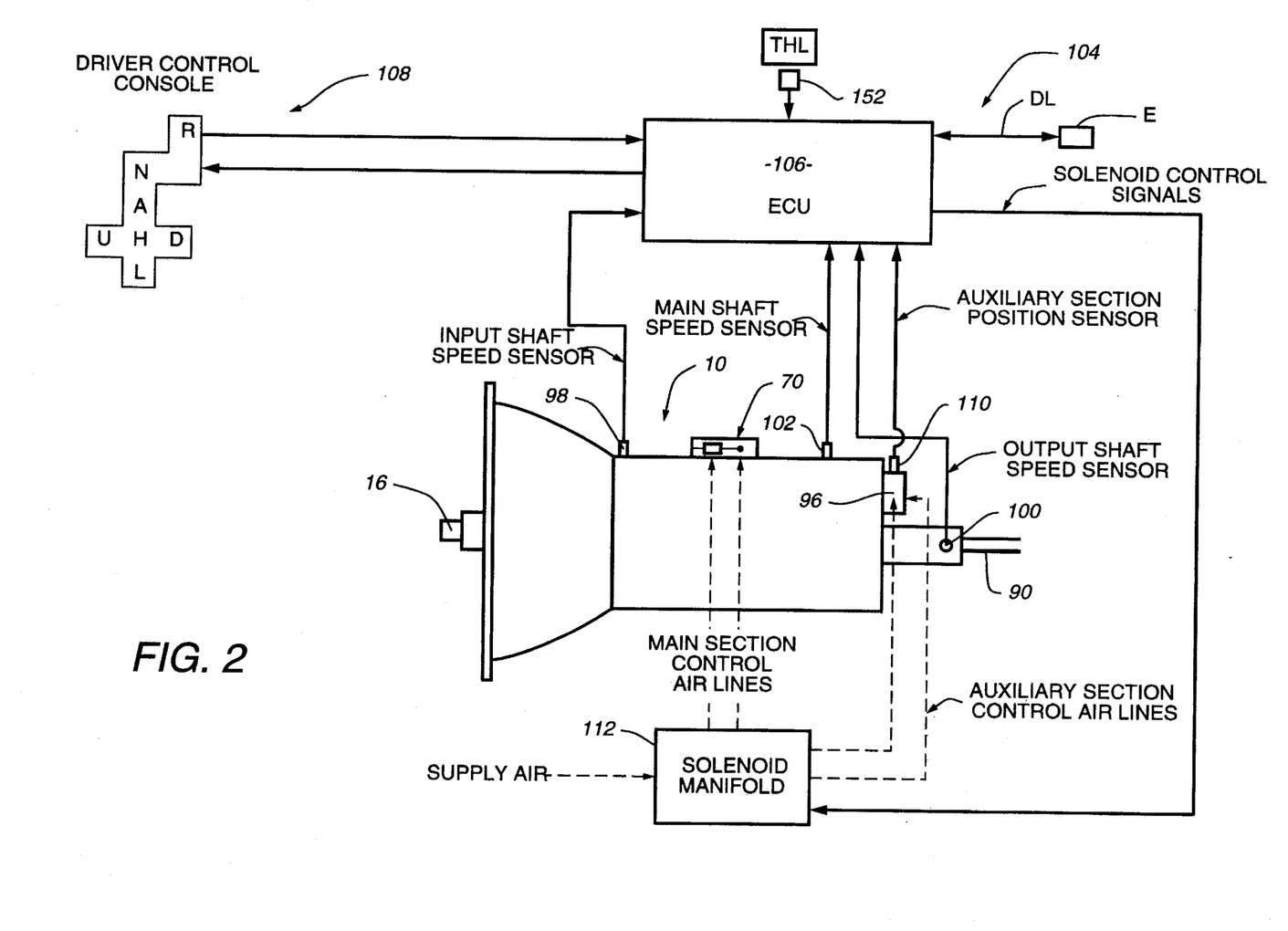
FIG. 2 is a schematic illustration of the automatic preselect and semi-automatic shift implementation system for a mechanical transmission system of the present invention.

The automatic preselect and automatic or semi-automatic shift implementation control system 104 for a mechanical transmission system of the present invention is schematically illustrated in FIG. 2. Control system 104, in addition to the mechanical transmission 10 described above, includes an electronic control unit 106, preferably microprocessor based, for receiving input signals from the input shaft speed sensor 98, from the output shaft speed sensor 100 (or, alternatively, the mainshaft speed sensor 102), from the driver control console 108, from a throttle pedal P position sensor 152, and from the engine E though data link DL. Typically, at least information indicative of engine speed (ES), gross engine torque ($T_{EG}$) and base engine friction torque ($T_{BEF}$) will be available on the datalink. The ECU 106 may also receive inputs from an auxiliary section position sensor 110.

The ECU 106 may be of the type schematically illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108, and through the data link DL to engine E.

In the preferred embodiment, the driver control counsel allows the operator to manually select a shift in a given direction (up or down) or to neutral from the currently engaged ratio, or to select a semi-automatic preselect mode of operation (D), and preferably provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 may be of the "R-N-D-H-L" (i.e., reverse-neutral-drive-hold-low) type with a manual upshift and downshift selector.

To implement a selected shift, the manifold 112 is preselected to cause actuator 70 to be biased to shift main transmission section 12 into neutral. This is accomplished by the operator or the ECU controller causing a torque reversal by momentarily decreasing and/or increasing the supply of fuel to the engine, see U.S. Pat. No. 4,850,236, the disclosure of which is incorporated herein by reference. As the transmission is shifted into neutral, and neutral is verified by the ECU (neutral sensed for a period of time such as 1.5 seconds), if the selected shift is a compound shift, i.e., a shift of both the main section 12 and of the range section 14, such as a shift from fourth to fifth speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged ($GR_{TARGET}$), which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

Under certain operating conditions of the vehicle, an automatically or manually selected shift may not be completable or will result in unacceptable vehicle performance after completion of an upshift. These conditions usually involve upshifts when the vehicle is heavy loaded and/or is traveling against a great resistance, such as in mud, up a steep grade and/or into a strong headwind.

By way of example, to achieve substantial synchronous conditions to complete an upshift, the speed of the input shaft 10 (which substantially equals the speed of the engine E with the master clutch engaged) must be decreased to substantially equal the speed of the output shaft 90 (directly proportional to vehicle speed) multiplied by the target gear ratio. As an automated clutch actuator and input shaft brake are not provided, the speed of the input shaft will decrease with the rate of decay of engine speed. Thus, to achieve substantially synchronous conditions for engagement of the target ratio, IS should substantially equal $OS*GR_{TARGET}$ and, with the master clutch fully engaged, IS will substantially equal ES.

Figure 5:
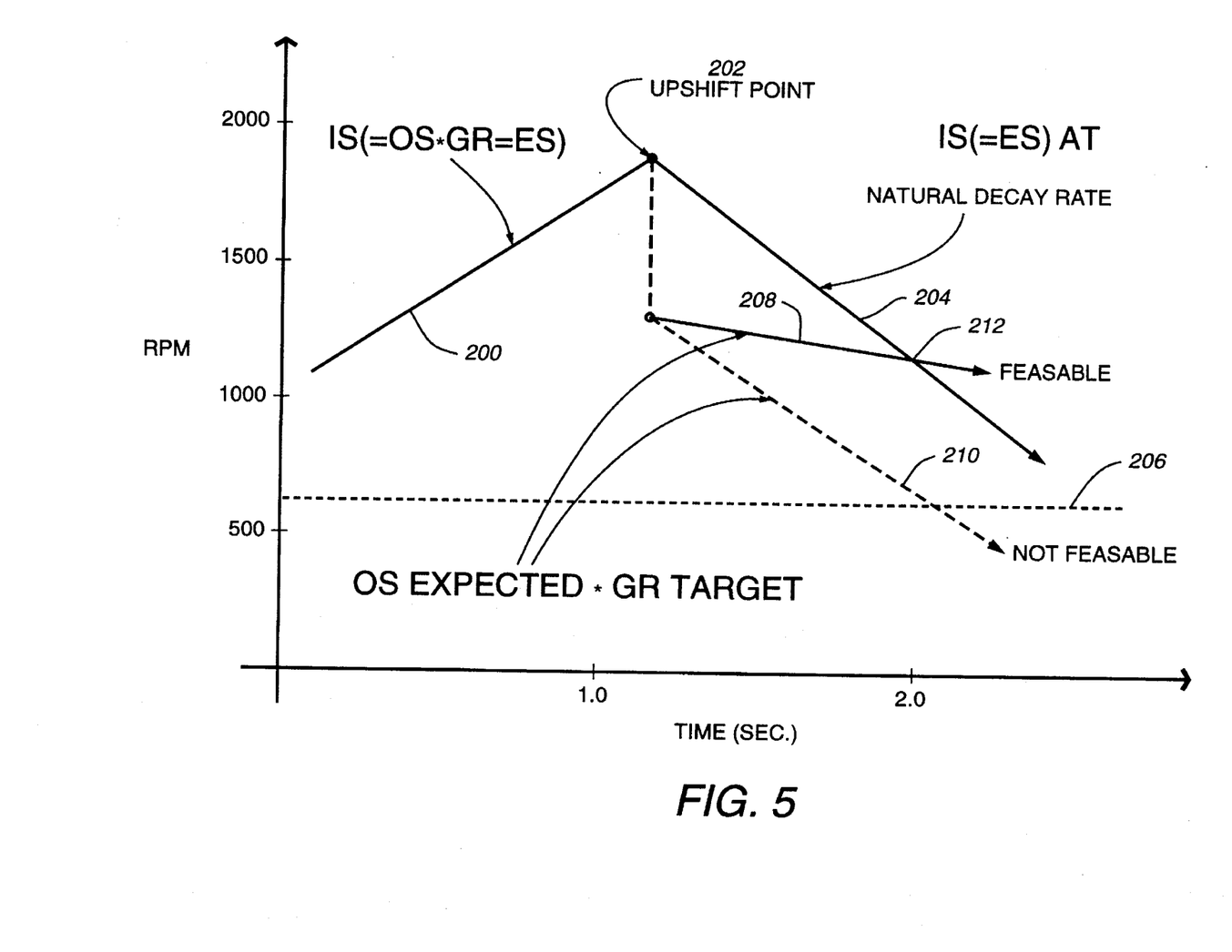
FIG. 5 is a graphical representation of an upshift event illustrating both feasible and not feasible attempted shifts.

The sequence of an upshift of the illustrated automated mechanical transmission system is graphically illustrated in FIG. 5. Line 200 represents the input shaft speed (IS) at vehicle conditions prior to the upshift point 202 wherein the current gear ratio (GR) is fully engaged, the master clutch C is fully engaged, and ES=IS=OS*GR. Upon a shift into neutral, as the engine is defueled (i.e., fueling of the engine is reduced to a minimum value), the input shaft speed and engine speed will decay at the constant (but not necessarily linear) rate (dIS/dt) represented by line 204 until idle speed 206 is reached. The expected speed of the output shaft 90 during the shift transient when zero engine torque is applied to the vehicle drive wheels ($OS_{EXPECTED}$) multiplied by the target gear ratio, which product is the required synchronous speed of the input shaft/engine, is represented by lines 208 and 210 illustrating, respectively, that product at a lesser or greater resistance to motion of the vehicle. As may be seen, under conditions of lower resistance (line 208), synchronous will occur at point 212 and the selected upshift is feasible while, under conditions of greater resistance (line 210), substantial synchronous will not occur and the selected upshift is not feasible.

Shift feasibility and/or desirability also may be determined on the basis of flywheel torque, as may be seen by reference to aforementioned U.S. Pat. No. 5,272,939.

In a typical diesel engine of a heavy duty truck, the engine/input shaft decay rate is about 300 to 800 RPM and both the engine and vehicle deceleration may be approximated as linear. The specific rate of decay of the engine and/or input shaft may be learned by differentiating the value of ES and/or IS signals during a defueling condition (see, for example, aforementioned U.S. Pat. No. 4,361,060). The decay rate may vary considerably, however, with temperature and use of engine-driven accessories.

As may be seen by reference to FIG. 5, if the input shaft speed (IS) (as determined by initial input shaft speed at point 202 and the acceleration of the input shaft (dIS/dt)) will be substantially equal to the product of expected output shaft speed at zero torque to the vehicle drive wheels ($OS_{EXPECTED}$), which is determined by initial OS (—IS/GR) and the vehicle acceleration (dOS/dt) at current resistance to vehicle motion, multiplied by the numerical value of the target gear ratio ($GR_{TARGET}$) at a value greater than a reference (such as engine idle speed 206), then achieving a synchronous shift into the selected target gear ratio is feasible; if not, achieving a substantially synchronous shift into the selected target gear ratio is infeasible. The OS and dOS/dt signals are, of course, equivalent to vehicle speed and vehicle acceleration signals, respectively. The reference value is illustrated as engine idle speed 206 but can be a lower positive value if the master clutch is manually or automatically disengaged.

For purposes of feasibility determination, for vehicles having a widely variable gross combined weight ("GCW"), i.e., combined weight of vehicle, fuel, cargo (if any) passengers (if any) and operator, the controller will determine current GCW. From this information, the system can determine what the vehicle acceleration (usually a deceleration) will be at zero driveline torque, i.e., the slope of line 208 or 210. Based upon this information and a present or learned value of engine decay rate, i.e., the slope of line 204, which may vary with engine speed, operating temperature, operation of an engine brake, etc., the ECU can then determine if, under current vehicle operating conditions, the system is able to successfully complete the proposed upshift. Based upon this information, the control system can then either (i) issue command signals to implement the proposed upshift, or (ii) modify the proposed shift (usually command a single rather than a skip upshift, or (iii) cancel/prohibit the shift request for a predetermined period of time (such as, for example, about 10 seconds).

Briefly, the acceleration of the vehicle at zero torque to the drive wheels can be approximated by the relationship:

$$A_{O\ TORQUE} = A_i - (T_i/CW)$$

where:

$A_i$=vehicle acceleration at engine torque i to the drive wheels,

C=a constant, $T_i$=engine torque i to the drive wheels, and

W=gross combined vehicle weight.

Figure 3A:
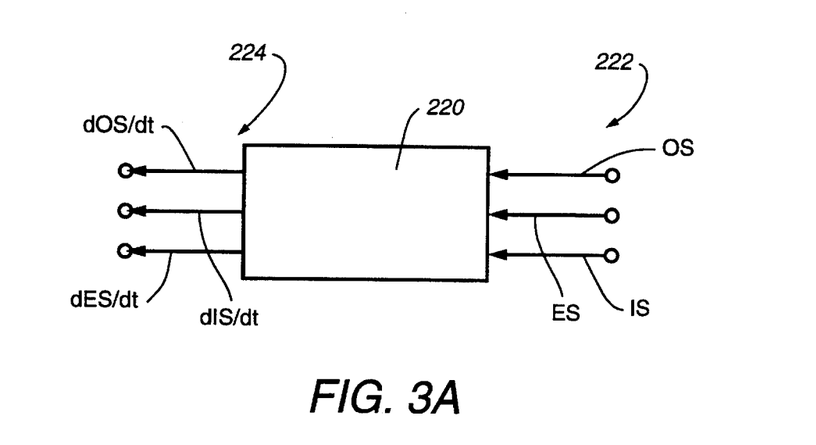
FIG. 3A is a schematic illustration of logic for differentiating signals representative of current vehicle and engine speed.

FIG. 3A schematically illustrates a logic element or subroutine 220 for differentiating various input signals 222, such as OS and/or ES, to determine the derivatives with respect to time thereof, dOS/dt and/or dES/dt, as output signals 224.

Figure 3B:
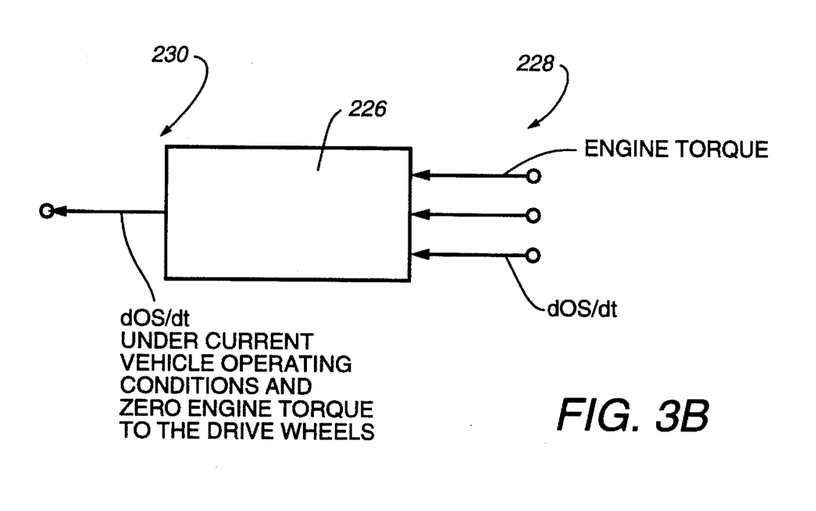
FIG. 3B is a schematic illustration of logic for calculating an expected vehicle acceleration during the shift transient when zero engine torque is applied to the drive wheels.

FIG. 3B schematically illustrates a logic element or subroutine 226 wherein input signals 228, including signals indicative of engine torque and vehicle acceleration (dOS/dt), are processed according to the logic rules set forth above to determine an output signal value 230 indicative of expected vehicle acceleration (dOS/dt) during the shift transient when no engine torque is applied to the vehicle drive wheels.

The foregoing is illustrative of a control system which automatically evaluates the feasibility, under current vehicle operating conditions, of manually or automatically preselected shifts and either causes such proposed shifts to be executed, modified or cancelled. In the event of a manually selected upshift determined to be unfeasible, the operator may be issued a tactile, audible or visual warning.

As illustrated above, in fully automated or partially automated mechanical transmission systems, it is desirable to know the torque at the flywheel ($T_{FW}$) and/or the engine deceleration rate (dES/dt rate) for many control algorithms. Knowing true torque at the flywheel and/or the engine deceleration rate (dES/dt rate) will allow more precise shift control and makes possible advanced algorithms, such as shiftability and GCW calculations. Flywheel torque is a function of accessory torque. The control of this invention uses torque information from the engine (preferably an electronic engine) along with vehicle and engine acceleration information to calculate these control parameters.

For controlling a fully or partially automated vehicular mechanical transmission system, it is important to be able to determine an accurate value indicative of drivewheel torque. Drivewheel torque may be determined as a function of engine flywheel torque (i.e., input torque to the vehicle master clutch or torque converter) if drivetrain parameters, such as current transmission gear ratio, drive axle ratio, drivetrain efficiency and tire size, are known.

For heavy-duty vehicles with electronically controlled engines communicating on datalinks of the type defined in SAE J1922 and J1939 protocols, engine torque may be represented by the relationship:

$$T_{EG}=T_{FW}+T_{BEF}+T_{ACCES}+T_{ACCEL}$$

where:

$T_{EG}$=gross engine torque;

$T_{FW}$=flywheel torque;

$T_{BEF}$=base engine friction torque;

$T_{ACCES}$=accessory torque; and $T_{ACCEL}$=torque to accelerate the engine.

Gross engine torque ($T_{EG}$) and base engine friction torque ($T_{BEF}$), the torque necessary to drive engine manufacturer-supplied devices (such as oil pumps) and to overcome internal engine friction, are parameters available on the electronic databus (DL). Torque to accelerate the engine ($T_{ACCEL}$) is determined as a function of sensed engine acceleration and known engine moment of inertia ($T_{ACCEL}$= dES/dt * $I_{ENGINE}$). It is noted that $T_{ACCEL}$ may have a positive or negative value.

Accordingly, to determine flywheel torque ($T_{FW}$), which is a control parameter in shiftability logic, GCW determination logic and the like, it is necessary to provide a control technique for determining accessory torque ($T_{ACCES}$). The value of accessory torque ($T_{ACCES}$) may vary substantially and often, as vehicular accessories such as lights, air-conditioning, fan drives and the like are turned off and on automatically or by the vehicle operator and/or passengers.

Assuming unaided engine deceleration (no engine brake operation), it has been observed that engine accessory torque ($T_{ACCES}$) and engine deceleration rate (dES/dt rate) vary dependently upon each other. Engine deceleration rate (dES/dt rate) is the rate of engine deceleration when the transmission is in neutral and/or the master clutch is fully disengaged, and fueling is set at a minimal value. As accessory load increases, the engine deceleration rate increases in proportion to it.

For controlling the automated mechanical transmission system, it also may be necessary to determine the engine deceleration rate (dES/dt) at a time when the vehicle is not in motion and/or has not been shifting.

Figure 6:
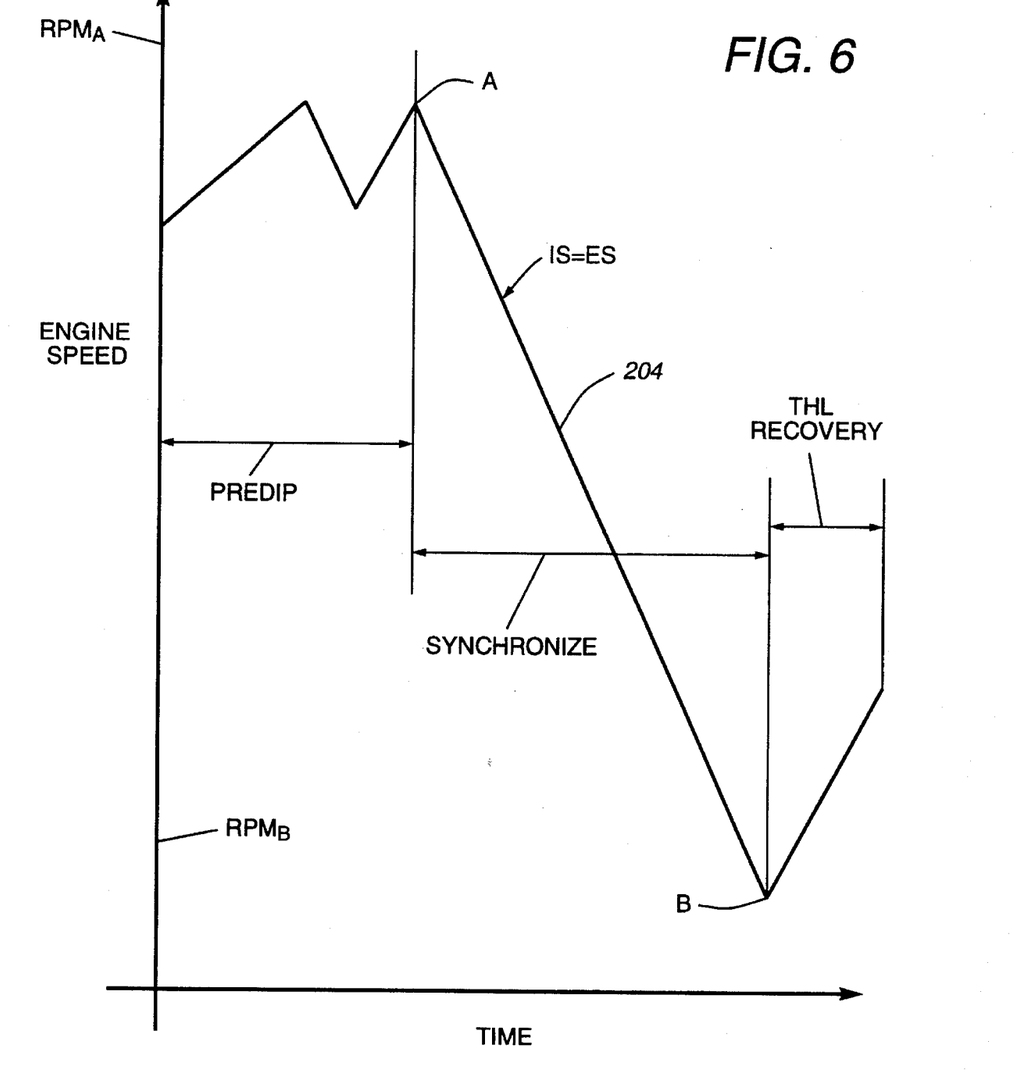
FIG. 6 is a graphical representation, similar to FIG. 5, of engine speed and input shaft speed during an upshift.

Engine deceleration when the vehicle is in motion and upshifting is determined as follows. For automated transmission systems of the type having an engine controlled by the ECU over an electronic datalink of the type defined in the SAE J1922 or J1939 protocol, the engine is operated in a "predip" mode prior to disengagement of the existing ratio, in a "synchronizing" mode after a shift from the existing ratio into neutral, and in the "throttle recovery" mode immediately after engagement of the target gear ratio. The engine and input shaft speeds in these modes are illustrated in FIG. 6. In the "predip" mode, fueling is modulated to cause driveline torque reversals to relieve torque lock conditions. In the "synchronizing" mode, engine fueling is minimized, allowing engine and input shaft speeds to decay down to a synchronous speed for engaging the target gear ratio (ES=IS=OS * $GR_{TARGET}$). In the "throttle recovery" mode, the fueling of the engine is smoothly returned to that value indicated by the operator's positioning of the throttle pedal.

To accurately determine the current engine deceleration rate value while in the synchronous mode of engine operation, and to minimize the effects of noise, torsionals and the like, it is important that for each measurement, the greatest possible differential between initial and final engine speed be utilized, and that a filtering technique be utilized. Accordingly, to determine a value indicative of current engine deceleration, readings must be taken during the synchronous engine control phase of an upshift, and should include a first reading at or near point A in FIG. 6 when the synchronous engine control phase is first initiated, and a second reading at or near point B in FIG. 6 when the synchronous engine control phase is ended or is about to end. The current value for engine deceleration ($dES_{CURRENT}$) will then be ($RPM_A - RPM_B$)÷($Time_A - Time_B$). This value is then filtered to provide an updated control parameter, for example:

$$dES_{UPDATED} = [(dES_{CURRENT}) + ((7)*(dES_{PREVIOUS}))] \div 8$$

The occurrence of point A is taken as the first time operation in the synchronous mode is sensed. The occurrence of point B is taken as the first time operation in the throttle recovery mode is sensed. As no measurable change in engine speed is expected in the cycle times between entering the upshift engine control subroutine (i.e., about 40 milliseconds), this is a very accurate method of obtaining the maximum magnitude of change in engine speed during the synchronous operation of each upshift.

Experience with heavy-duty vehicles has shown that a 4:1 to 20:1 filtering technique, preferably about a 7:1 filtering technique, provides suitable responsiveness while filtering out the drivetrain noises due to vibrations, torsionals and the like.

The present invention provides a control method/system for controlling an at least partially automated vehicular mechanical transmission system wherein accessory torque and engine deceleration rate may be determined with the vehicle in motion or at rest.

When the vehicle is stopped with the engine idling and the transmission in neutral or the master clutch disengaged, accessory torque ($T_{ACCES}$) is substantially equal to gross engine torque minus base engine friction torque ($T_{EG} - T_{BEF}$). $T_{EG} - T_{BEF}$ is also referred to as "net engine torque." This value is preferably sensed from the databus or datalink (DL) and preferably subject to a filtering averaging process.

Figure 7:
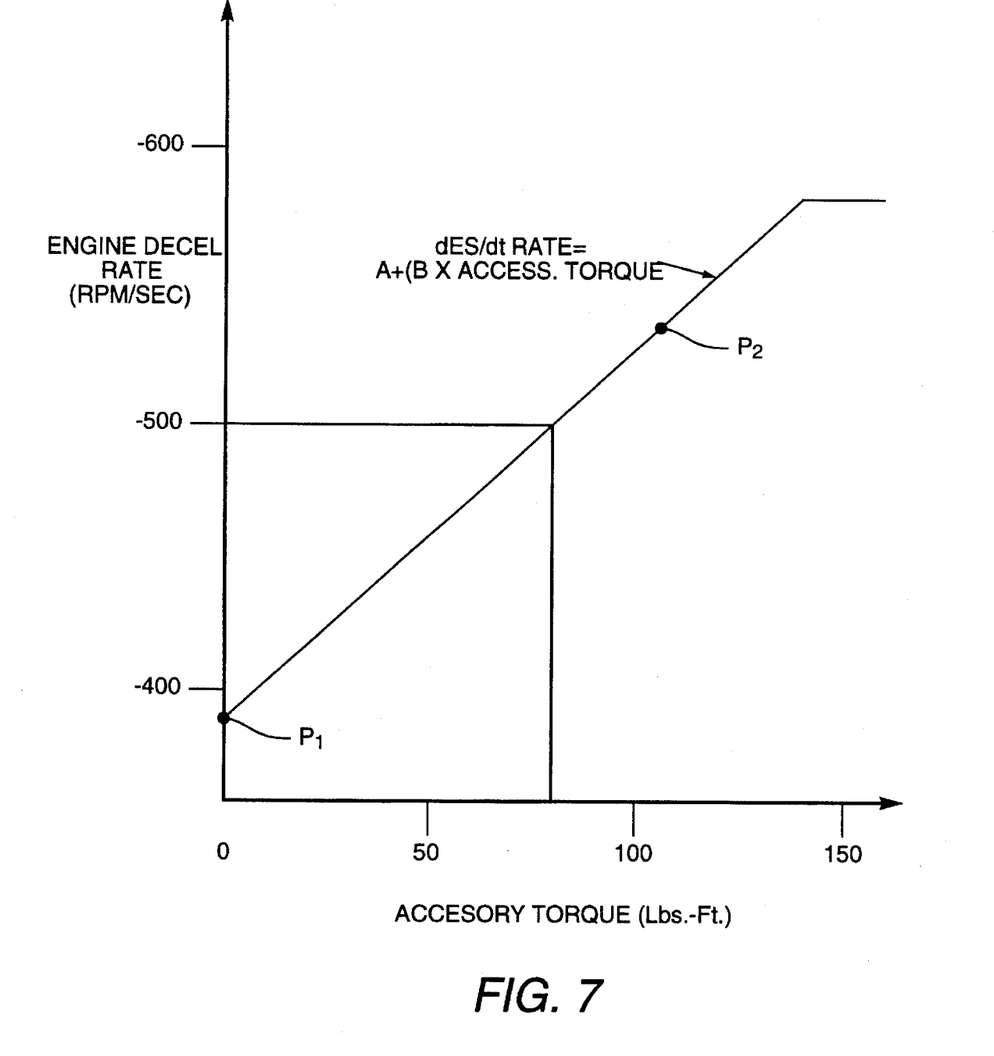
FIG. 7 is a graphical representation of the substantially linear relationship between accessory torque ($T_{ACCES}$) and engine deceleration rate (dES/dt rate).

The system controller is provided with information which relates engine deceleration rate (dES/dt rate) to accessory torque ($T_{ACCES}$) in a predetermined, substantially linear manner wherein engine deceleration rate equals A+(B * accessory torque) where "A" and "B" are predetermined, stored parameters. If dES/dt rate is in units of RPM/second and $T_{ACCES}$ is in units of pound-feet, then "A" will be in units of RPM/second and "B" will be in units of RPM/second/pound-feet. FIG. 7 is a graphical representation of this relationship.

Using the foregoing relationship and the value of accessory torque, an expected engine deceleration rate may be determined while the vehicle is at rest. The rate thus determined or derived is an approximation for the system logic to utilize for vehicle start-up and is corrected and updated using filtered, actually sensed engine deceleration values as soon as the vehicle gets moving and making upshifts.

When the vehicle is moving and has performed upshifts, engine deceleration rate (dES/dt rate) may be determined by observing actual engine deceleration when the transmission is in neutral and engine fueling is reduced to a minimal value and, preferably, calculating a filtered average of the observed values. See, for example, aforementioned co-pending U.S. patent application Ser. No. 08/225,271, entitled ENGINE DECELERATION DETERMINATION METHOD/SYSTEM. Accessory torque ($T_{ACCES}$) is then determined from the same predetermined linear relationship discussed above, i.e., $T_{ACCES}$=(engine deceleration rate– A)÷B. Using the example of FIG. 7, engine deceleration rate equals –385+(–2 * $T_{ACCEL}$) and, at an observed, averaged engine deceleration rate (dES/dt rate) of –500 RPM/second, accessory torque ($T_{ACCES}$) would equal about 81.25 pound feet.

While the linear relationship is defined as predetermined for a given vehicle configuration, the relationship also may be adaptively learned by the controller logic or empirically determined at the end of the vehicle assembly line. For example, to determine this substantially linear relationship during the end of the vehicle assembly line checkout and testing procedure, the following procedure may be followed:

(1) Warm up vehicle engine to nominal operating temperature;

(2) Turn off all accessories (lights, air-conditioning, etc.) with vehicle stopped in neutral, then accelerate engine to governed speed by depressing accelerator pedal, and then release pedal and monitor and record engine deceleration rate through a maximum operating speed (i.e., about 1,800 RPM);

(3) Let engine idle and observe accessory torque by monitoring engine datalink, this is one point, P on the line in FIG. 7;

(4) Turn on all accessories with vehicle stopped in neutral, then accelerate engine to governed speed by depressing accelerator pedal, and then release pedal and monitor and record engine deceleration rate;

(5) Let engine idle and observe accessory torque by monitoring the datalink, this is a second point, P on the line in FIG. 7; and (6) Using the two points thus determined, determine the linear equation and enter the corresponding calibrations into the transmission system controller.

It is noted that the foregoing procedure may be performed manually or as a routine in an end-of-line calibration computer logic. Alternatively, a similar procedure may be incorporated into the transmission controller logic.

Figure 4A:
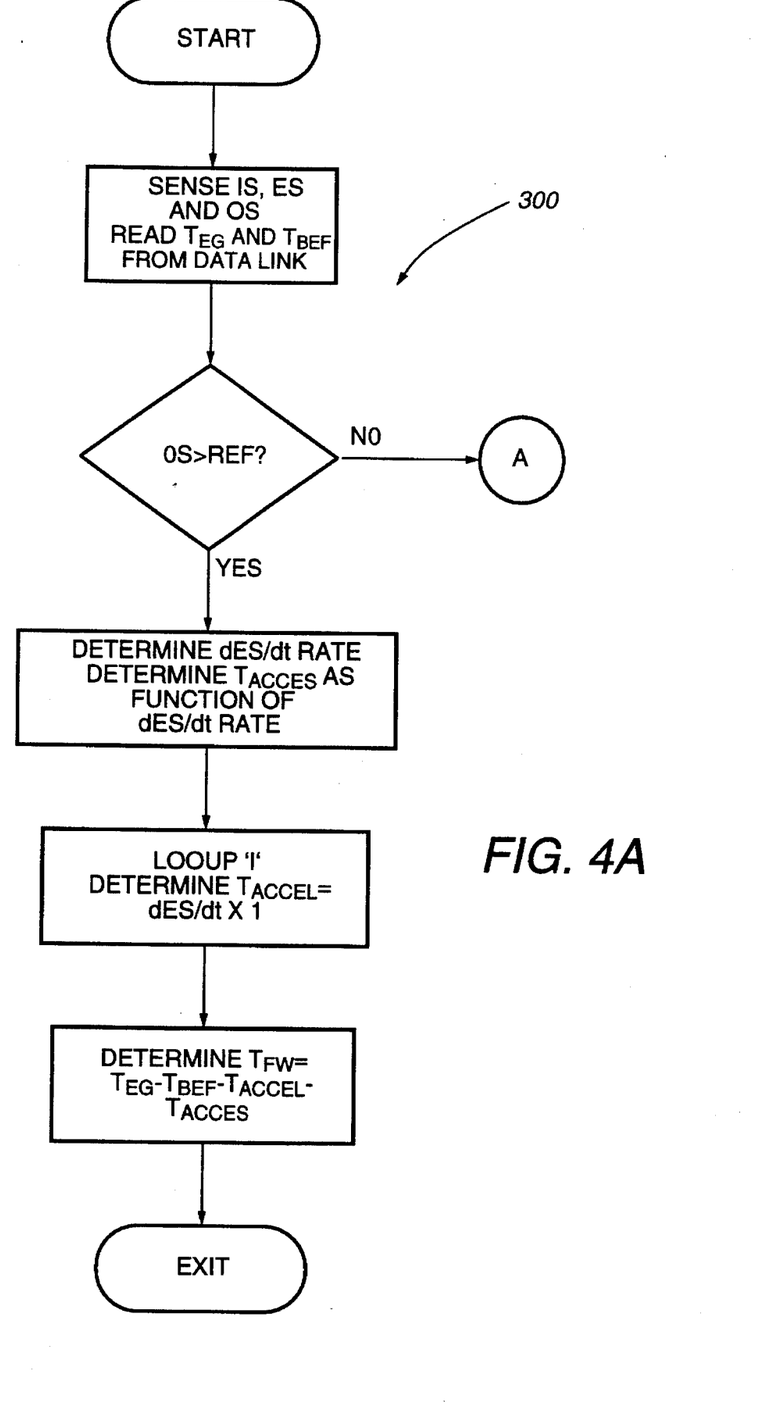
FIGS. 4A and 4B are schematic illustrations, in flow chart format, of the inventive control method of the present invention.
Figure 4B:
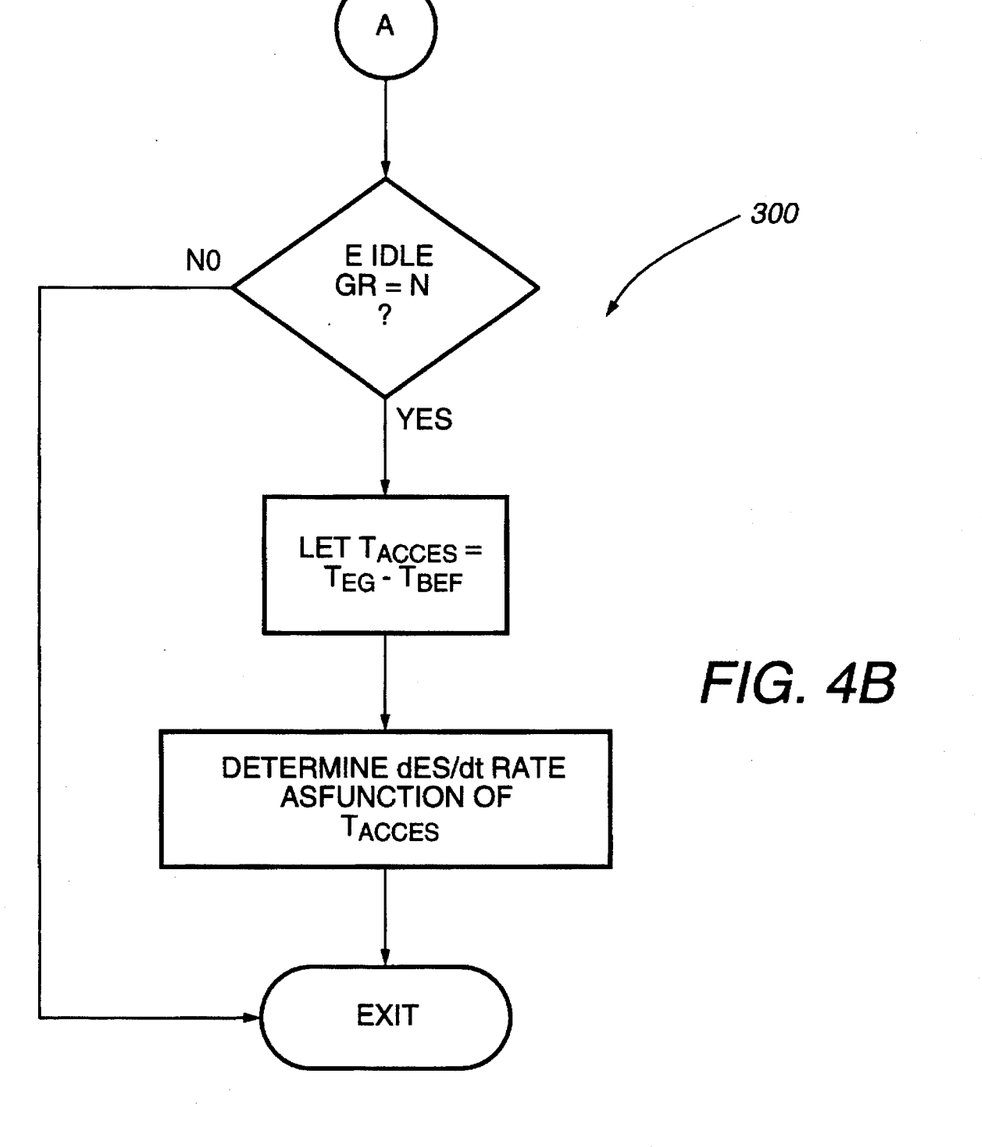

Utilizing the foregoing techniques, an accurate value of $T_{FW} = T_{EG} - T_{BEF} - T_{ACCES} - T_{ACCEL}$ and of engine deceleration rate (dES/dt rate) may be determined. The accessory torque ($T_{ACCES}$), flywheel torque ($T_{FW}$) and engine deceleration rate (dES/dt rate) determination method/system of the present invention is schematically illustrated, in flow chart format, in FIGS. 4A and 4B.

Accordingly, it may be seen that a relatively simple and inexpensive shift implementation control system/method for automated mechanical transmission system 10 is provided, which utilizes existing input signals and a determined relationship between unaided engine deceleration rate (dES/dt rate) and accessory torque ($T_{ACCES}$) to provide accurate values indicative of the accessory torque ($T_{ACCES}$), flywheel torque ($T_{FW}$) and engine deceleration rate (dES/dt rate) control parameters.

Although the present invention has been described with a certain degree of particularity, it is understood that various changes to form and detail may be made without departing from the spirit and the scope of the invention as hereinafter claimed.

I claim:

1. In a vehicular automated mechanical transmission system comprising a fuel throttle-controlled internal combustion engine (E), an operator-set fuel throttle device (P), a multiple-speed change-gear mechanical transmission (10) having an input shaft (16) and an output shaft (90) adapted to drive vehicular drivewheels, said input shaft drivingly connected to said engine by a master friction clutch (C) and a control unit (106) for receiving input signals, including an input signal (ES, IS) indicative of input shaft or engine rotational speed, an input signal ($T_{GE}$) indicative of gross engine torque and an input signal ($T_{BEF}$) indicative of base engine friction torque, and for processing said signals in accordance with predetermined logic rules to determine control parameters and to issue command output signals to transmission system actuators, including means for controlling fueling of the engine and means (70) for controlling shifting of the transmission, a method for determining, during vehicle conditions when the engine is at idle and either one of the transmission is in neutral or the master clutch is disengaged, a value of a control parameter (dES/dt rate) indicative of engine deceleration rate for shifting said transmission, said method characterized by:

providing a predetermined relationship ((dES/dt rate)=A+ (B * $T_{ACCES}$)) between engine deceleration rate (dES/dt rate) and accessory torque ($T_{ACCES}$);

determining a value of a control parameter ($T_{ACCES}$) indicative of accessory torque;

determining a value of said control parameter indicative of engine deceleration rate as a function of the value of said parameter indicative of accessory torque and said relationship;

evaluating feasibility of subsequent upshifts as a function of the value of said control parameter indicative of engine deceleration rate and controlling shifting as a function of the valve of said control parameter.

2. The method of claim 1 wherein the value of said parameter ($T_{ACCES}$) indicative of accessory torque is determined as a function of gross engine torque and base engine friction torque.

3. The method of claim 2 wherein the value of said parameter ($T_{ACCES}$) indicative of accessory torque is determined as a function of the expression:

$$T_{ACCES}=T_{EG}-T_{BEF}$$

4. The method of claim 1 wherein said current values of at least some of said control parameters are determined as a filtered average value.

5. The control method of claim 2 wherein said engine and said control unit communicate over an electronic datalink (DL) carrying said signals indicative of gross engine torque ($T_{EG}$) and base engine friction torque ($T_{BEF}$).

6. The method of claim 1 wherein said relationship is predetermined and stored by said control unit.

7. The method of claim 3 wherein said relationship is predetermined and stored by said control unit.

8. The method of claim 1 wherein said relationship is substantially linear.

9. The method of claim 3 wherein said relationship is substantially linear.

10. The control method of claim 1 wherein said transmission system performs dynamic upshifts from an engaged ratio into a target gear ratio in a sequence of operations, all without disengagement of the master clutch and regardless of operator's setting of the throttle device, comprising:

(a) a predip operation wherein fueling of the engine is manipulated to allow disengagement of the engaged gear ratio;

(b) after confirmation of disengagement of the engaged gear ratio, a synchronizing operation wherein fueling of the engine is reduced, allowing engine rotational speed to decrease toward the synchronous speed for engagement of the target ratio (ES=IS=OS * $GR_T$); and (c) after achieving substantial synchronous rotational speed of said engine and causing engagement of said target gear ratio, a throttle recovery operation wherein fueling of the engine is caused to be controlled by sensed operator setting of said throttle device;

said value of said control parameter (dES/dt rate) indicative of the engine deceleration rate determined during vehicle travel by a method comprising:

during the predip operation, sensing engine speed;

sensing initiation of said synchronizing operation, and upon sensing initiation of said synchronizing operation, causing sensed engine speed to equal engine speed initial ($RPM_A$), and starting a timing sequence;

sensing initiation of the throttle recovery operation, and upon sensing initiation of said throttle recovery operation, causing engine speed to equal engine speeed final ($RPM_B$), sensing elapsed time from starting of said timing sequence; and determining the current value of the control parameter indicative of the engine deceleration rate as a function of the difference between engine speed final and engine speed initial and of the elapsed time.

11. A method for determining, during vehicle-in-motion conditions, a value of a control parameter ($T_{ACCES}$) indicative of accessory torque of a vehicular internal combustion engine (E) in a vehicular automated mechanical tranmission system comprising a fuel throttle-controlled internal combustion engine (E), an operator-set fuel throttle device (P), a multiple-speed change-gear mechanical transmission (10) having an input shaft (16) and an output shaft (90) adapted to drive vehicular drivewheels, said input shaft drivingly connected to said engine by a master friction clutch (C) and a control unit (106) for receiving input signals, including an input signal (ES, IS) indicative of input shaft or engine rotational speed, and for processing said signals in accordance with predetermined logic rules to determine control parameters and to issue command output signals to transmission system actuators, including means for controlling fueling of the engine and means (70) for controlling shifting of the transmission, said method characterized by:

providing a predetermined relationship ((dES/dt rate)=A+ (B * $T_{ACCES}$)) between engine deceleration rate (dES/dt rate) and accessory torque ($T_{ACCES}$);

determining, when either one of the transmission is in neutral or the clutch is disengaged, a value of a control parameter (dES/dt rate) indicative of engine deceleration rate;

determining a value of said control parameter ($T_{ACCES}$) indicative of accessory torque as a function of said relationship and the value of said control parameter indicative of engine deceleration rate;

determining a value of a control parameter ($T_{FW}$) indicative of flywheel torque as a function of said value of control parameter indicative of accessory torque ($T_{ACCES}$); and controlling shifting of the transmission as a function of the value of said control parameter indicative of flywheel torque ($T_{FW}$).

12. The method of claim 11 wherein said current values of at least some of said control parameters are determined as a filtered average value.

13. The control method of claim 11 wherein said engine and said control unit communicate over an electronic datalink (DL) carrying signals indicative of gross engine torque ($T_{EG}$) and base engine friction torque ($T_{BEF}$).

14. The method of claim 11 wherein said relationship is predetermined and stored by said control unit.

15. The method of claim 11 wherein said relationship is substantially linear.

16. A method for determining, during vehicle-in-motion conditions, a value of a control parameter ($T_{ACCES}$) indicative of accessory torque of a vehicular internal combustion engine (E) in a vehicular automated mechanical tranmission system comprising a fuel throttle-controlled internal combustion engine (E), an operator-set fuel throttle device (P), a multiple-speed change-gear mechanical transmission (10) having an input shaft (16) and an output shaft (90) adapted to drive vehicular drivewheels, said input shaft drivingly connected to said engine by a master friction clutch (C) and a control unit (106) for receiving input signals, including an input signal (ES, IS) indicative of input shaft or engine rotational speed, and for processing said signals in accordance with predetermined logic rules to determine control parameters and to issue command output signals to transmission system actuators, including means for controlling fueling of the engine and means (70) for controlling shifting of the transmission, said transmission system performing dynamic upshifts from an engaged ratio into a target gear ratio in a sequence of operations, all without disengagement of the master clutch and regardless of operator's setting of the throttle device, comprising:

(a) a predip operation wherein fueling of the engine is manipulated to allow disengagement of the engaged gear ratio;

(b) after confirmation of disengagement of the engaged gear ratio, a synchronizing operation wherein fueling of the engine is reduced, allowing engine rotational speed to decrease toward the synchronous speed for engagement of the target ratio (ES=IS=OS * $GR_T$); and (c) after achieving substantial synchronous rotational speed of said engine and causing engagement of said target gear ratio, a throttle recovery operation wherein fueling of the engine is caused to be controlled by sensed operator setting of said throttle device;

said method characterized by determining a value of a control parameter (dES/dt rate) indicative of the engine deceleration rate comprising:

during the predip operation, sensing engine speed;

sensing initiation of said synchronizing operation, and upon sensing initiation of said synchronizing operation, causing sensed engine speed to equal engine speed initial ($RPM_A$), and starting a timing sequence;

sensing initiation of the throttle recovery operation, and upon sensing initiation of said throttle recovery operation, causing engine speed to equal engine speeed final ($RPM_B$), sensing elapsed time from starting of said timing sequence; and determining the current value of the control parameter indicative of engine deceleration rate as a function of the difference between engine speed final and engine speed initial and of the elapsed time, providing a predetermined relationship ((dES/dt rate)= A+(B * $T_{ACCES}$)) between engine deceleration rate (dES/dt rate) and accessory torque ($T_{ACCES}$);

determining a value of said control parameter ($T_{ACCES}$) indicative of accessory torque as a function of said relationship and the value of said control parameter indicative of engine deceleration rate; and controlling shifting as a function of the valve of said control parameter.

17. In a vehicular automated mechanical transmission system comprising a fuel throttle-controlled internal combustion engine (E), an operator-set fuel throttle device (P), a multiple-speed change-gear mechanical transmission (10) having an input shaft (16) and an output shaft (90) adapted to drive vehicular drivewheels, said input shaft drivingly connected to said engine by a master friction clutch (C) and a control unit (106) for receiving input signals, including an input signal (ES, IS) indicative of input shaft or engine rotational speed, an input signal ($T_{GE}$) indicative of gross engine torque and an input signal ($T_{BEF}$) indicative of base engine friction torque, and for processing said signals in accordance with predetermined logic rules to determine control parameters and to issue command output signals to transmission system actuators, including means for controlling fueling of the engine and means (70) for controlling shifting of the transmission, a control system for determining, during vehicle conditions when the engine is at idle and either one of the transmission is in neutral or the master clutch is disengaged, a value of a control parameter (dES/dt rate) indicative of engine deceleration rate, said control system characterized by:

means for providing a predetermined relationship ((dES/dt rate)=A+(B * $T_{ACCES}$)) between engine deceleration rate (dES/dt rate) and accessory torque ($T_{ACCES}$);

means for determining a value of a control parameter ($T_{ACCES}$) indicative of accessory torque as a function of gross engine torque and base engine friction torque;

means for determining a value of said control parameter indicative of engine deceleration rate as a function of the value of said parameter indicative of accessory torque and said relationship;

means for evaluating feasibility of subsequent upshifts as a function of the value of said control parameter indicative of engine deceleration rate means responsive to said feasibility means for shifting said transmission.

18. The control system of claim 17 wherein the value of said parameter ($T_{ACCES}$) indicative of accessory torque is determined as a function of the expression:

$$T_{ACCES} = T_{EG} - T_{BEF}$$

19. The control system of claim 17 wherein said engine and said control unit communicate over an electronic datalink (DL) carrying said signals indicative of gross engine torque ($T_{EG}$) and base engine friction torque ($T_{BEF}$).

20. The control system of claim 17 wherein said relationship is predetermined and stored by said control unit.

21. A control system for determining, during vehicle-in-motion conditions, a value of a control parameter ($T_{ACCES}$) indicative of accessory torque of a vehicular internal combustion engine (E) in a vehicular automated mechanical tranmission system comprising a fuel throttle-controlled internal combustion engine (E), an operator-set fuel throttle device (P), a multiple-speed change-gear mechanical transmission (10) having an input shaft (16) and an output shaft (90) adapted to drive vehicular drivewheels, said input shaft drivingly connected to said engine by a master friction clutch (C) and a control unit (106) for receiving input signals, including an input signal (ES, IS) indicative of input shaft or engine rotational speed, and for processing said signals in accordance with predetermined logic rules to determine control parameters and to issue command output signals to transmission system actuators, including means for controlling fueling of the engine and means (70) for controlling shifting of the transmission, said control system characterized by:

- means for providing a predetermined relationship (($dES/dt$ rate)$=A+(B * T_{ACCES})$) between engine deceleration rate ($dES/dt$ rate) and accessory torque ($T_{ACCES}$);
- means for determining, when either one of the transmission is in neutral or the clutch is disengaged, a value of a control parameter ($dES/dt$ rate) indicative of engine deceleration rate;
- means for determining a value of said control parameter ($T_{ACCES}$) indicative of accessory torque as a function of said relationship and the value of said control parameter indicative of engine deceleration rate;
- means for determining a value of a control parameter ($T_{FW}$) indicative of flywheel torque as a function of said value of control parameter indicative of accessory torque ($T_{ACCES}$); and
- means for controlling shifting of the transmission as a function of the value of said control parameter indicative of flywheel torque ($T_{FW}$).

22. The control system of claim 21 wherein said transmission system performs dynamic upshifts from an engaged ratio into a target gear ratio in a sequence of operations, all without disengagement of the master clutch and regardless of operator's setting of the throttle device, comprising:

(a) a predip operation wherein fueling of the engine is manipulated to allow disengagement of the engaged gear ratio;

(b) after confirmation of disengagement of the engaged gear ratio, a synchronizing operation wherein fueling of the engine is reduced, allowing engine rotational speed to decrease toward the synchronous speed for engagement of the target ratio ($ES=IS=OS * GR_T$); and (c) after achieving substantial synchronous rotational speed of said engine and causing engagement of said target gear ratio, a throttle recovery operation wherein fueling of the engine is caused to be controlled by sensed operator setting of said throttle device;

said means for determination of the value of a control parameter ($dES/dt$ rate) indicative of the engine deceleration rate comprising:

- means for during the predip operation, sensing engine speed;
- means for sensing initiation of said synchronizing operation, and upon sensing initiation of said synchronizing operation, causing sensed engine speed to equal engine speed initial ($RPM_A$), and starting a timing sequence;
- means for sensing initiation of the throttle recovery operation, and upon sensing initiation of said throttle recovery operation, causing engine speed to equal engine speed final ($RPM_B$), sensing elapsed time from starting of said timing sequence; and
- means for determining the current value of the control parameter indicative of engine deceleration rate as a function of the difference between engine speed final and engine speed initial and of the elapsed time.

\* \* \* \* \*